US010831666B2

(12) United States Patent
Shi et al.

(10) Patent No.: US 10,831,666 B2
(45) Date of Patent: Nov. 10, 2020

(54) SECONDARY STORAGE SERVER CACHING

(71) Applicant: Oracle International Corporation, Redwood Shores, CA (US)

(72) Inventors: Jia Shi, Campbell, CA (US); Wei Zhang, Foster City, CA (US); Vijayakrishnan Nagarajan, Redwood City, CA (US); Shih-Yu Huang, Mountain View, CA (US); Kothanda Umamageswaran, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 160 days.

(21) Appl. No.: 16/153,674

(22) Filed: Oct. 5, 2018

(65) Prior Publication Data
US 2020/0110700 A1  Apr. 9, 2020

(51) Int. Cl.
G06F 12/084 (2016.01)
G06F 11/14 (2006.01)
(Continued)

(52) U.S. Cl.
CPC ........ *G06F 12/084* (2013.01); *G06F 11/1448* (2013.01); *G06F 12/0897* (2013.01); *G06F 16/24552* (2019.01)

(58) Field of Classification Search
CPC . G06F 11/1446–1474; G06F 12/00–16; G06F 16/24552
See application file for complete search history.

(56) References Cited

U.S. PATENT DOCUMENTS 5,897,634 A    4/1999  Attaluri et al.
6,078,994 A    6/2000  Carey
(Continued)

FOREIGN PATENT DOCUMENTS

EP           2 842 040 A1    3/2015
KR       10-2010-0131054    12/2010

OTHER PUBLICATIONS

U.S. Appl. No. 13/037,172, filed Feb. 28, 2011, Final Office Action, dated Mar. 29, 2016.
(Continued)

*Primary Examiner* — Nicholas J Simonetti
(74) *Attorney, Agent, or Firm* — Hickman Palermo Becker Bingham LLP

(57) ABSTRACT

Techniques related to failover to the secondary storage server from a primary storage server of a database server without degrading the performance of servicing storage requests for client applications are provided. In an embodiment, the secondary storage server receives, from the database server, an eviction notification indicating that a set of data blocks has been evicted from a cache. The secondary storage server's memory hierarchy includes a secondary cache and a secondary persistent storage that stores a second copy of the set of data blocks. The secondary storage server persistently stores a copy of data, which is also persistently stored on the primary storage server, which includes a first copy of the set of data blocks. In an embodiment, upon receiving the eviction notification, the secondary storage server retrieves the second copy of the set of data blocks from the secondary persistent storage of the secondary storage server and loads the second copy of the set of data blocks into the secondary cache. After an interruption event, the secondary storage receives a request for a subset of the set of data blocks based on a request for data, at the database server. Upon receiving the request for the subset of the set
(Continued)

of data blocks, the second storage server retrieves the subset of the set of data blocks from the second copy of the set of data blocks stored on the secondary cache of the secondary storage server without retrieving any of such data blocks from the second copy of the set of data blocks stored on the persistent storage of the secondary storage server. The second storage server sends the subset of the set of data blocks to the database server.

28 Claims, 10 Drawing Sheets

(51) Int. Cl.
    *G06F 12/0897*     (2016.01)
    *G06F 16/2455*     (2019.01)

(56) References Cited

U.S. PATENT DOCUMENTS

| | | | |
|---|---|---|---|
| 6,434,672 | B1 | 8/2002 | Gaither |
| 6,557,082 | B1 | 4/2003 | Josten et al. |
| 6,633,891 | B1 | 10/2003 | Bamford et al. |
| 6,851,024 | B1 | 2/2005 | Wilkes et al. |
| 7,581,064 | B1 | 8/2009 | Zedlewski |
| 7,822,727 | B1 | 10/2010 | Shaughnessy |
| 7,840,752 | B2 | 11/2010 | Hu et al. |
| 8,489,820 | B1 | 7/2013 | Ellard |
| 9,703,706 | B2 | 7/2017 | Bagal et al. |
| 2002/0026448 | A1 | 2/2002 | Bird et al. |
| 2002/0052914 | A1 | 5/2002 | Zalewski et al. |
| 2004/0215883 | A1 | 10/2004 | Bamford et al. |
| 2005/0193160 | A1 | 9/2005 | Bhatt et al. |
| 2005/0204112 | A1 | 9/2005 | O'Connor et al. |
| 2005/0223174 | A1 | 10/2005 | Mogi |
| 2006/0143256 | A1 | 6/2006 | Galchev |
| 2006/0248131 | A1 | 11/2006 | Marwinski et al. |
| 2009/0070337 | A1 | 3/2009 | Romem |
| 2009/0164733 | A1 | 6/2009 | Kim et al. |
| 2009/0276654 | A1 | 11/2009 | Butterworth et al. |
| 2010/0122026 | A1 | 5/2010 | Umamageswaran et al. |
| 2010/0161912 | A1 | 6/2010 | Daniel |
| 2010/0185817 | A1 | 7/2010 | Magenheimer |
| 2011/0113036 | A1 | 5/2011 | Idicula et al. |
| 2011/0238746 | A1 | 9/2011 | Chess |
| 2012/0005158 | A1 | 1/2012 | Bhatt et al. |
| 2012/0221768 | A1 | 8/2012 | Bagal et al. |
| 2013/0339572 | A1 | 12/2013 | Fanning et al. |
| 2014/0324785 | A1 | 10/2014 | Gupta et al. |
| 2015/0212744 | A1* | 7/2015 | Helman .............. G06F 12/0897 711/103 |
| 2017/0300427 | A1* | 10/2017 | Lin ....................... G06F 12/128 |
| 2017/0308470 | A1 | 10/2017 | Bagal et al. |
| 2018/0004661 | A1* | 1/2018 | Umehara ............ G06F 12/0808 |
| 2018/0267898 | A1* | 9/2018 | Henry .................... G06N 3/063 |
| 2018/0336143 | A1* | 11/2018 | Lai ...................... G06F 12/0811 |
| 2020/0104259 | A1* | 4/2020 | Wang ................. G06F 12/0817 |

OTHER PUBLICATIONS

Bagal, U.S. Appl. No. 13/037,172, filed Feb. 28, 2011, Notice of Allowance, dated Mar. 1, 2017.
Bagal, U.S. Appl. No. 13/037,172, filed Feb. 28, 2011, Office Action, dated Jan. 7, 2013.
Bagal, U.S. Appl. No. 13/037,172, filed Feb. 28, 2011,Office Action, dated May 23, 2013.
Bagal, U.S. Appl. No. 13/037,172, filed Feb. 28, 2011, Office Action, dated Nov. 9, 2016.
Bagal, U.S. Appl. No. 15/645,794, filed Jul. 10, 2017, Notice of Allowance, dated Jun. 5, 2018.
Bagal, U.S. Appl. No. 13/037,172, filed Feb. 28, 2011, Final Office Action, dated Sep. 16, 2013.
U.S. Appl. No. 13/037,172, filed Feb. 28, 2011, Advisory Action, dated Jul. 12, 2016.
U.S. Appl. No. 13/037,172, filed Feb. 28, 2011, Office Action, dated Nov. 5, 2015.
U.S. Appl. No. 13/037,172, filed Feb. 28, 2011, Final Office Action, dated Apr. 16, 2015.
U.S. Appl. No. 13/037,172, filed Feb. 28, 2011, Final Office Action, dated Sep. 16, 2013.
U.S. Appl. No. 13/037,172, filed Feb. 28, 2011, Interview Summary, dated Jul. 5, 2016.
U.S. Appl. No. 13/037,172, filed Feb. 28, 2011, Interview Summary, dated Nov. 9, 2016.
U.S. Appl. No. 13/037,172, filed Feb. 28, 2011, Office Action, dated Jan. 7, 2013.
U.S. Appl. No. 13/037,172, filed Feb. 28, 2011, Office Action, dated May 23, 2013.
U.S. Appl. No. 13/037,172, filed Feb. 28, 2011, Office Action, dated Nov. 6, 2014.
Bagal, U.S. Appl. No. 15/645,794, filed Jul. 10, 2017, Office Action, dated Jan. 26, 2018.
Yadgar et al., "Karma: Know it All Replacement for a Multilevel Cache", dated Jan. 1, 2007, 16 pages.
Wong, Theodore M., and Wilkes, John, "My cache or yours? Making storage more exclusive." Jun. 2002. USENIX. FAST '02.
Venkatarman, Shivakumar, Global Memory Management for Multi-Server Database Systems. 1996. University of Wisconsin—Madison. pp. 24-32.
Soundararajan, Gokul et al., "Dynamic Partitioning of the Cache Hierarchy in Shared Data Centers." Aug. 2008. ACM. '08. pp. 635-646.
Rik Van Riel "Page replacement in Linux 2.4 memory management." Jun. 2001. USENIX; FREENIX 2001.
Peetz, Andreas, "A Myth Busted and an FAQ: ESXi is not Based on Linux! But what is it?", dated Aug. 2013, http://www.vfront.de/2013/08a-myth-busted-and-faqe-sxi-is-not based.html.
Liu, Xin et al. "CLIC: Client-Informed Caching for Storage Servers." Feb. 2009. USENIX. FAST '09. pp. 297-310.
Koltsidas, Ioannis and Viglas, Stratis D., "The Case for Flash-Aware Multi-Level Caching." 2009. University of Edinburgh. Tech Report EDI-INF-RR-1319.
Jung, Hoyoung et al. "LRU-WSR: Integration of LRU and Write Sequence Reordering for Flash Memory." Aug. 2008. IEEE. IEEE Transactions on Consumer Electronics. vol. 54. pp. 1215-1223.
Hennessy, John L., and Patterson, David A., Computer Architecture: A Quantitative Approach. 2007; Elsevier. 4th ed. pp. 287-315.
Culler et al., "Parallel Computer Architecture", dated Aug. 1997, Morgan Kaufmann, pp. 263-290, dated 1997.
Chandrasekaran, Sashikanth and Bamford, Roger, "Shared Cache—The Future of Parallel Databases." Mar. 2003. ICDE'03. pp. 840-850.
"In the Lab: Full ESX/vMotion Test Lab in a Box, Part 2", dated Aug. 2009, https://blog.solori.net/2009/08/17/in-the-lab-full-escmotion-test-lab-in-a-box-part-2/.
"In the Lab: Full ESX/vMotion Test Lab in a Box, Part 1", dated Aug. 2009, https://blog.solori.net/2009/08/17/in-the-lab-full-escmotion-test-lab-in-a-box-part-1/.
Shi, U.S. Appl. No. 15/705,166, filed Sep. 14, 2017, Final Office Action, dated Apr. 30, 2020.
Bagal, U.S. Appl. No. 16/153,610, filed Oct. 5, 2018, Office Action, dated Mar. 9, 2020.
Shi, U.S. Appl. No. 15/705,166, filed Sep. 14, 2017, Office Action, dated Sep. 19, 2019.

\* cited by examiner

SECONDARY STORAGE SERVER CACHING

TECHNICAL FIELD

Embodiments are generally related to information storage and retrieval technology. More specifically, embodiments are related to a server-side extension of client-side caches.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

For database management systems (DBMS) servicing client applications ensuring redundancy of components, on which the proper functioning of the database management system relies, is important. It becomes even more important in a cloud-based database management systems, in which there is no cross visibility between client application and database management system. The administrator of the client application has no control of operations of the cloud database management system, and vice versa.

If a DBMS component has a failure due to which the DBMS cannot service queries from a client application, the client application may be adversely affected by experiencing unacceptable downtimes. Thus, it is common to ensure redundancy of DBMS components and have a corresponding standby component for every critical component of the DBMS.

In the case of storage servers that service storage requests from the database server(s) of the database management system, redundancy is usually guaranteed not only on storage device level (e.g., RAID-based redundancy) but also on a storage server level. A separate, secondary storage server is kept in synch with the data of primary storage server that services the database server storage requests. If an interruption event occurs affecting the primary storage server, the DBMS fails over the database server to use the secondary storage server.

The "interruption event" term refers herein to any event that causes a storage server to be unable to at least partially service the received storage requests. Non-limiting examples of interruption events are memory or memory module failures, a failure of a non-memory component requiring a reboot or reset of the storage server for repair, and any reboot or reset of the storage server for planned or unplanned maintenance.

After the failover to the secondary storage server, the caches of the secondary storage server are at least in part empty. Thus, a client application may experience latency in processing its requests because the storage requests have caches misses and are serviced from slow-access persistent storage. As the secondary storage server caches become populated the latency goes away, but for a considerable time, the secondary storage server degrades the performance of the database management system and its client applications.

Furthermore, when the primary storage server recovers, it also may have either outdated cache or partially empty cache. Thus, the DBMS and its clients suffer another performance setback when the storage requests are routed back to the primary storage server.

Figure 1:
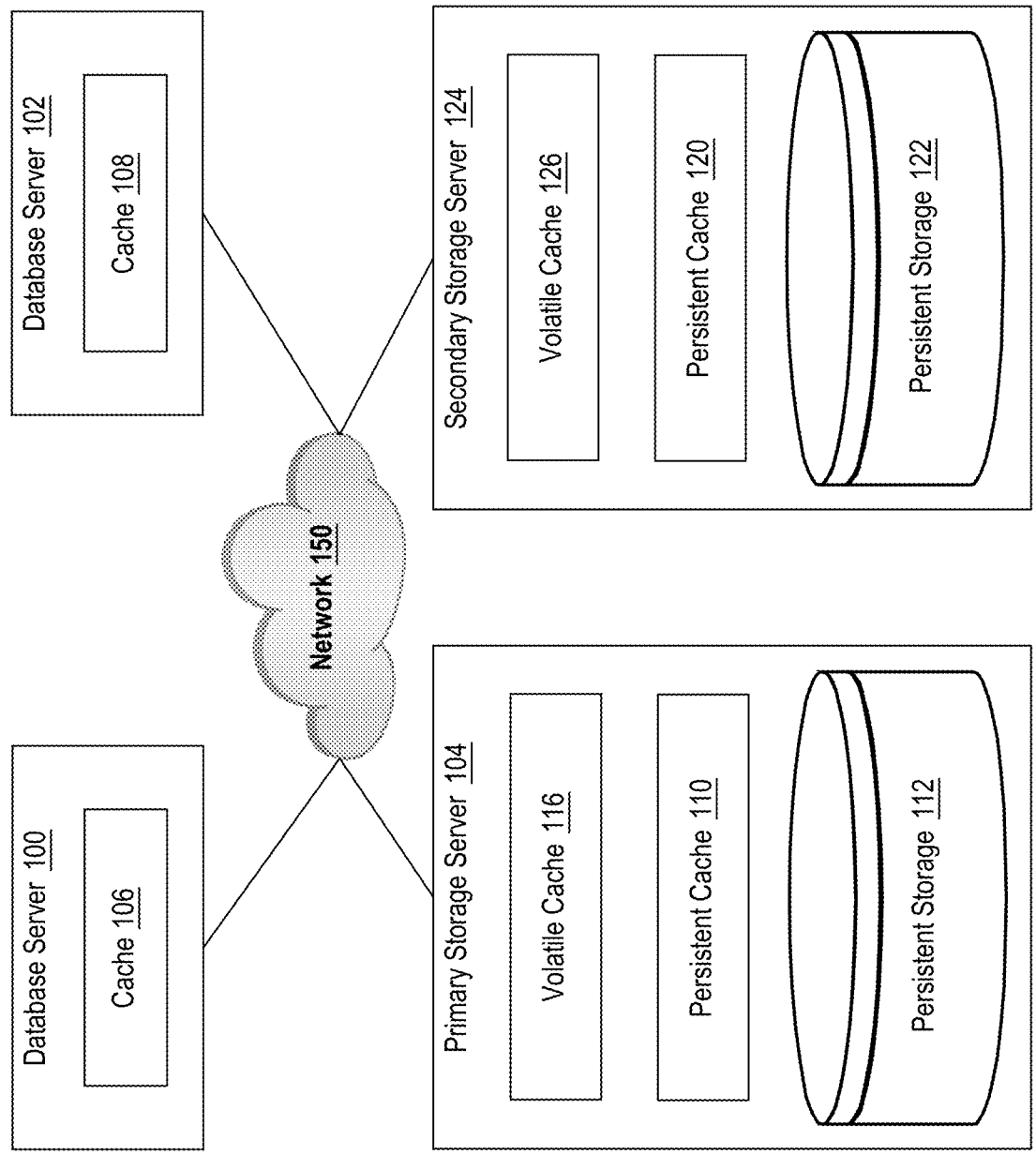
FIG. 1 is a block diagram that depicts a system diagram of an example clustered DBMS, in one or more embodiments.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" are used to differentiate elements and do not necessarily indicate any particular order.

General Overview

The approaches herein describe a failover to the secondary storage server from the primary storage server of a database server without degrading the performance of servicing storage requests for the client applications of the database server.

One approach to avoid degrading storage performance during failover to the secondary storage server is for the database server to send every read data or information thereof to the secondary storage server. The secondary storage server uses the received data to keep its caches up-to-date and thus, warmed up. However, such an approach would significantly increase I/O operations and burden the network that communicatively couples storage servers with database servers.

In an embodiment, when data is aged out from the database server(s) based on cache policies causing the data to be evicted from the cache, a notification is sent to the secondary storage server. The secondary storage server uses the notification to load a copy of the evicted data from its persistent storage into its cache.

Since a notification rather than the data itself is being sent to the secondary storage server, the I/O performance of the system is significantly improved. The notification only includes metadata which may be in the form of an address (or address range) of the evicted data, thus significantly improving the computational cost of transmitting the data over the network to the secondary storage server.

Further improvement of the system is derived from notifications being sent at times when data is evicted from database server cache rather than at each time data is read. Thus, the notifications are less frequently generated and sent, further avoiding burdening the I/O of the database management system and improving its performance.

Although the evicted data populated in the secondary cache may not be as fresh as the data that remains in the database server cache, after some period of time most of the frequently accessed data would be at some point evicted from the database server cache. Since the persistent cache of the secondary storage server is much larger than the database server cache, most (if not all) of the most frequently accessed data would eventually be copied into the persistent cache of the secondary storage server. Accordingly, after a failover, the secondary storage server can service database servers' storage requests without delay, thus maintaining the same performance of the database management system despite the failover.

In an embodiment, after the primary storage server recovers, its health state is set to degraded despite the recovery. During such time, the storage requests continue to be routed to the secondary storage rather than the recovered primary storage server. While in a degraded state, the recovered primary storage that has inadequately cached data starts receiving notifications about data eviction, in an embodiment. The primary storage, similar to the secondary storage server prior to the failover, uses the notifications to warm-up its cache. Accordingly, once warmed-up, there is no degradation in performance when the primary storage server takes over the storage requests from the secondary storage server.

System Overview

Techniques described herein may be implemented on a clustered database environment. A clustered database environment provides many advantages, such as fault tolerance and load balancing. Some clustered database environments have a shared-everything or a shared-disk architecture. Referring to FIG. 1, database servers 100-102 concurrently access or "share" primary storage server 104 and collectively implement server-side functions of a database management system (DBMS). Conceptually, database servers 100-102 operate as front-end servers, and storage server 104 operates as a back-end server. For ease of reference, the front-end and back-end are hereinafter referred to as the database-side and the storage-side, respectively. Although the clustered database environment of FIG. 1 only depicts two database servers, it should be appreciated that a clustered database environment may comprise any number of database servers.

Each database server 100, 102 is a compute node that runs one or more instances of a database server. Each database server instance is a collection of memory and processes that interact with storage server 104 to access memory locations therein. Storage server 104 exhibits a server-client relationship with each database server 100, 102. For example, database server 100, 102 may request data from storage server 104, and in response, a storage server, such as primary storage server 104, may return requested data to database server 100, 102. Thus, from the perspective of storage servers, the database-side and the storage-side can also be referred to as the client-side and the server-side, respectively.

In an embodiment, a clustered database environment includes redundant shared storage servers, such as primary storage server 104 and secondary storage server 124. During normal operations, read storage requests from database servers 100 and 102 are directed to primary storage server 104. The write storage requests are directed to both primary storage server 104 and secondary storage server 124. Accordingly, the clustered database environment keeps secondary storage 124's stored data up-to-date with the primary storage server 104's data updates. If an interruption event occurs that affects the ability of primary storage server 104 to service storage requests from database servers 100 and/or 102, then the requests are directed to secondary storage server 124. Since secondary storage server 124 stores up-to-date data, the storage requests can be still serviced by secondary storage server 124.

In an embodiment, database servers 100/102 and storage servers 104 and 124 are communicatively coupled with one or more of each other through a network. Network, such as network 150, broadly represents a digital data telecommunications network comprising a communications network, such as a local area network (LAN), a wireless LAN (WLAN), a storage area network (SAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), a cellular network or a combination thereof.

Storage server 104 may include persistent storage 112 and/or may be communicatively coupled to an external device that includes persistent storage 112. Persistent storage 112 may comprise one or more storage devices that retain data in the absence of any electrical power. For example, persistent storage 112 may include one or more magnetic storage disks. Persistent storage 112 may be used as a data store that backs a plurality of caches, such as database server caches 106-108 and persistent cache 110. Desired data may be absent from the plurality of caches for various reasons, such as cache misses or hardware failures. However, when desired data is absent from the plurality of caches, storage server 104 may retrieve a copy of the data from persistent storage 112. Similarly, secondary storage server comprises of persistent storage 122 and persistent cache 120, in an embodiment. The arrangement and functionality described for persistent storage 112 and persistent cache 110 of primary storage server 104 may similarly apply to persistent storage 122 and persistent cache 120 of secondary storage server 124.

Database systems implement database-side caches. In the example of FIG. 1, database servers 100-102 comprise caches 106-108, respectively. Each database-side cache 106, 108 may be all or part of a volatile memory of a database server 100, 102. Examples of volatile memory include random-access memory (RAM), main memory, and/or the like.

In general, performing input/output (I/O) operations in volatile memory is faster than performing I/O operations in non-volatile memory, such as persistent storage 112. One reason is that volatile memory is a lower-latency storage medium relative to non-volatile memory. For example, performing I/O operations in RAM may avoid costlier disk I/O operations, seek times, and/or the like. Another reason is that volatile memory is typically in closes proximity to processors than is non-volatile memory. For example, RAM can be on-chip or chip-adjacent, whereas a hard disk drive is off-chip and coupled to processors via a communication fabric.

In light of the above, it is understandably faster to perform I/O operations in local volatile memory instead of in remote non-volatile memory when a network connection, such as network 150, separates database-side processors from storage-side non-volatile memory. In the example of FIG. 1, each database server 100, 102 is remote from persistent storages 112/122, thereby exposing I/O performance times to network latency. To reduce such exposure, database servers 100, 102 locally cache data received from storage servers 104/124 in order to speed up performance of future I/O operations involving the data.

To further speed up the performance of I/O operations, database servers 100-102 may also be communicatively coupled to each other via an interconnect (not shown in FIG. 1). An interconnect enables even faster performance of I/O operations based on "cache fusion" or transferring data directly between database-side caches. For example, a "dirty" data block may be transferred from database-side cache 106 to database-side cache 108 without the intervening step of writing the "dirty" data block to persistent storages 112/122. Cache fusion is described in detail in U.S. Pat. No. 6,353,836, titled "METHOD AND APPARATUS FOR TRANSFERRING DATA FROM THE CACHE OF ONE NODE TO THE CACHE OF ANOTHER NODE," issued on Mar. 5, 2002, the contents of which are incorporated herein by reference.

The term "data block" refers herein to a logical structure in which data is stored. Each data block corresponds to a particular number of bytes of physical storage space. For example, each data block may correspond to two kilobytes of disk space. To be clear, however, data may be stored as data blocks in a cache as well as in persistent storages 112/122. In fact, cached data blocks may be categorized as "clean" or "dirty." A "clean" data block is a copy of a data block that is the same version of the data block stored in persistent storages 112/122. In other words, a "clean" data block has not been modified after being cached. In contrast, a "dirty" data block is a copy of a data block that is a different version of the data block stored in persistent storages 112/122. For example, a "dirty" data block may have been modified in a database server cache 106, 108. For the sake of clarity and ease of explanation, the terms "data" and "data block" are used herein to refer to data or a data block as well as copies of the data or the data block.

Introduction: Storage Server Cache

Clustered database systems may also employ some form of caching at the storage-side. Storage servers, such as storage server 104, may include persistent cache, such as persistent cache 110 and/or may be communicatively coupled to an external device that includes persistent cache. Like persistent storages 112/122, persistent caches 110/120 may comprise one or more storage devices that retain data in the absence of any electrical power. However, persistent caches 110/120 are typically a lower-latency storage medium relative to persistent storages 112/122. For example, persistent cache 120 may include one or more solid-state drives.

For primary storage server 104 that receives storage requests from database servers 100/102, primary persistent cache 110 may be used as a storage-side cache that backs database-side caches 106-108. Desired data may be absent from a database-side cache 106, 108 for various reasons, such as cache misses or hardware failures. However, when desired data is absent from a database-side cache 106, 108, storage server 104 may look for the data in primary persistent cache 110 before looking for the data in primary persistent storage 112. As mentioned above, performing I/O operations in primary persistent cache 110 is typically faster than performing I/O operations in primary persistent storage 112, so storage server 104 performs I/O operations in primary persistent cache 110 instead of primary persistent storage 112 whenever possible.

Typically, the data in any given database-side cache 106, 108 is likely replicated in primary persistent cache 110. As used herein, the term "inclusive" refers to such a relationship between primary persistent cache 110 and any given database-side cache 106, 108. To clarify what is meant by an "inclusive" cache, reference is made to the diagram below.

| Database-Side Cache | | | | |
|---|---|---|---|---|
| A | B | C | D | E |
| Storage-Side Cache | | | | |
| A B C D E F G H I J | | | | |

Notably, each of Data Blocks A-E is stored in both the database-side cache and the storage-side cache.

However, primary persistent cache 110 is typically a higher-latency storage medium relative to volatile memory. For example, including round-trip messaging costs and context switch costs, performing I/O operations in flash memory may take about 250 microseconds, whereas performing I/O operations in volatile memory may take less than 100 microseconds. Furthermore, primary persistent cache 110 may be incompatible with certain techniques that reduce network-related latency costs. For example, remote direct memory access (RDMA) enables direct memory access from a memory region of one computer to a memory region of another computer without involving the operating systems of either computer, but primary persistent cache 110 is typically implemented as a device, not a memory region. In contrast, storage-side volatile memory is a memory region, so RDMA can be used to perform I/O operations in storage-side volatile memory less than 10 microseconds.

Thus, implementing a storage-side volatile memory cache would be desirable to enable even faster performance of I/O operations. In many cases, however, volatile memory at the storage-side is limited to a storage capacity that is smaller than that of any database-side cache. This prevents storage-side volatile memory from exhibiting an inclusive relationship with any database-side cache. To illustrate the problem, reference is made to the diagram below.

| Database-Side Cache | | | | |
|---|---|---|---|---|
| A | B | C | D | E |
| Storage-Side Cache | | | | |
| A | | B | | C |

Notably, the storage-side cache has insufficient space for storing Data Blocks D-E. A storage-side cache implemented in this manner would be of little, if any, use, because a cache miss at the database-side would necessarily mean a cache miss at the storage-side.

Therefore, what is needed is a robust approach for using a storage-side volatile memory cache to enable faster performance of I/O operations even when the storage-side volatile memory cache has a smaller storage capacity than any database-side cache.

Embodiments disclosed herein are related to a storage-side extension of database-side caches. Like the database-side caches, the storage-side extension is implemented as volatile memory that exhibits low latency and high I/O operations per second (TOPS). Although storage-side volatile memory operates much like a tail extension of any given database-side cache, in terms of a memory hierarchy, storage-side volatile memory can also be thought of as sitting below the database-side caches but above a storage-side persistent cache and storage-side persistent storage.

Using storage-side volatile memory as a tail extension of a database-side cache avoids situations in which a cache miss at the database-side necessarily means a cache miss at the storage-side. This is true even if the storage-side volatile memory has a smaller storage capacity than any database-side cache because the storage-side volatile memory should not have any duplicates of the data blocks stored in any of the database-side caches. In other words, the storage-side volatile memory is "exclusive" of any database-side cache.

As will be described in greater detail below, "exclusive" caches exhibit an either/or relationship in that any given data block may be stored either in Cache A or in Cache B, but not in both Cache A and Cache B. In general, at least several measures are used to achieve exclusivity. When the storage-side satisfies a read request from the database-side, the requested data block is stored in a database-side cache. However, if the requested data block was retrieved from the storage-side volatile cache, the requested data block is also evicted from the storage-side volatile cache. Conversely, when a clean data block is evicted from the database-side cache, the data block is responsively stored in the storage-side volatile cache.

Because the same data block is not stored in both the database-side and storage-side volatile caches, more data blocks may be stored collectively by the volatile caches. Thus, a request for a data block that results in a cache miss at the database-side may be satisfied by a cache hit at the storage-side. In some embodiments, "cold" data blocks in the tail end of a database-side volatile cache are evicted and then stored in the storage-side volatile cache, thereby causing the storage-side volatile cache to operate much like the "cold" end of a least recently used (LRU) and/or a least frequently use (LFU) cache having one or more database-side caches as its "hot" end.

Volatile Cache Extension

To achieve the faster performance of I/O operations, database-side caches are augmented with storage-side volatile memory. In an embodiment, volatile caches 116/126 are implemented as volatile memory of storage servers 104/124. As mentioned above, volatile memory provides lower latency and higher IOPS relative to non-volatile memory. Thus, when a cache miss occurs at the database-side, it would be more efficient to retrieve desired data from volatile caches 116/126 than from persistent caches 110/120 or persistent storage 112/122, respectively.

In one embodiment, primary volatile cache 116 can be thought of as an extension to database-side caches 106-108, where primary volatile cache 116 is the tail end of a single logical cache having database-side caches 106-108 at the head end. In a clustered database environment, database-side caches 106-108 collectively form the head end of the logical cache. For the sake of clarity and ease of explanation, however, reference is made to a logical cache comprising a single database-side cache 106, 108.

Similarly, the secondary volatile cache can be thought of as an extension of a logical cache of database server 106-108, when the secondary storage server 124 is servicing storage requests from database servers 100/102.

According to one or more embodiment, volatile caches are further described in "SERVER-SIDE EXTENSION OF CLIENT-SIDE CACHES," application Ser. No. 15/705,166, filed on Sep. 14, 2017, the entire contents of which are hereby incorporated by reference. Because the same data block is not stored in both the database-side and storage-side volatile caches, more data blocks may be stored collectively by the volatile caches. Thus, a request for a data block that results in a cache miss at the database-side may be satisfied by a cache hit at the storage-side.

Introduction: Memory Hierarchy

In some embodiments, "cold" data blocks in the tail end of a database-side volatile cache are evicted and then stored in the storage-side persistent cache, or alternatively or additionally in the volatile cache, thereby causing the storage-side caches to operate much like the "cold" end of a least recently used (LRU) and/or a least frequently use (LFU) cache having one or more database-side caches as its "hot" end.

Figure 2:
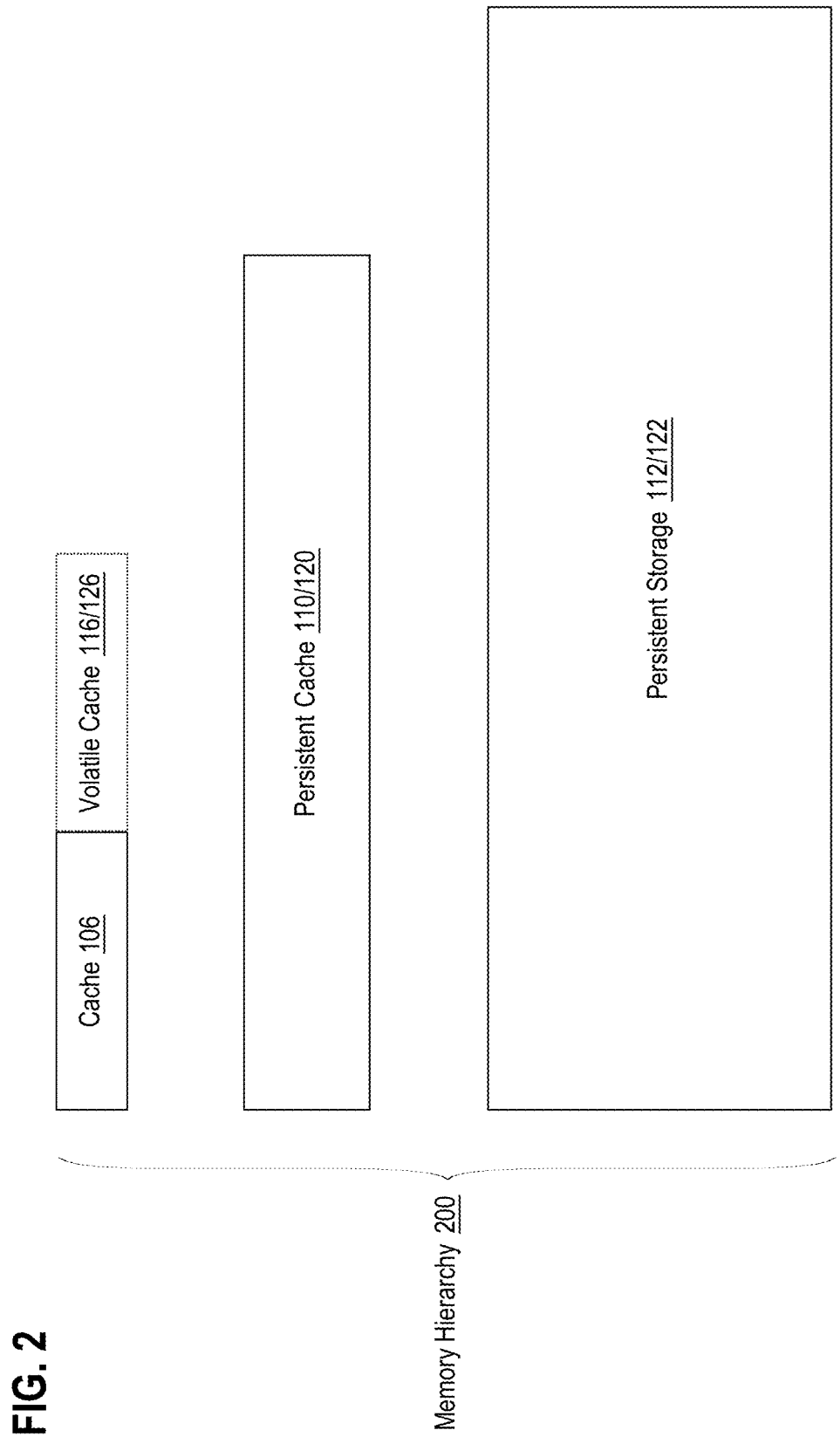
FIG. 2 is a block diagram that depicts a memory hierarchy of a storage server, in an embodiment.

FIG. 2 is a block diagram that depicts a memory hierarchy of a storage server, in an embodiment. Memory hierarchy 200 comprises a logical cache including database-side cache 106 at its "hot" or head end and, in some embodiments, volatile caches 116/126 at its "cold" or tail end. For example, the logical cache may be an LRU and/or LFU cache. Thus, the most recent and/or most frequently accessed data blocks of the logical cache are stored at the database-side, whereas the least recently and/or least frequently accessed data blocks of the logical cache are stored at the storage-side. However, database-side cache 106 and/or volatile caches 116/126 collectively operate as parts of the same cache. They exhibit an "exclusive" relationship because it is unnecessary to store duplicates of data blocks within the same cache.

In some embodiments, when the coldest data blocks of database-side cache 106 are evicted to free memory for more recently accessed data blocks, the evicted data blocks are moved to volatile cache 116/126 at the storage-side. A database server 100, 102 may track "hotness" or "coldness" based on access counts, access frequencies, and/or access times. When cache misses occur at database-side cache 106, data blocks that are read from storage-side volatile cache 116/126 are moved back to database-side cache 106. In a sense, the hottest data blocks of the storage-side volatile caches 116/126 are returned to the database side. However, it is unnecessary to track "hotness" or "coldness" in volatile caches 116/126. For example, volatile cache 116 or 126 may be implemented much like a first in, first out (FIFO) queue.

In the example of FIG. 2, memory hierarchy 200 further comprises persistent cache 110 or 120 and persistent storage 112 or 122. Notably, persistent cache 110 or 120 is depicted as having a larger storage capacity than database-side cache 106 and volatile cache 116 or 126, alone or in combination. In turn, persistent storage 112 or 122 is depicted as having a larger storage capacity than persistent cache 110 or 120.

As mentioned above, persistent cache 110 or 120 is "inclusive" of database-side cache 106. Thus, in an embodiment in which storage server 104 includes volatile cache 106, persistent cache 110 or 120 is also "inclusive" of volatile cache 116 or 126. To maintain the "inclusive" relationship between persistent cache 110 or 120 and the logical cache comprising database-side cache 106 and/or volatile cache 116 or 126, the volatile cache 116 or 126 may be implemented as a "write-though" cache with respect to persistent cache 110 or 120. In other words, a data block written to storage server 104 is written to persistent cache 110 or 120 and, in some embodiments, volatile cache 116 or 126 before completion of the write is confirmed. Accordingly, persistent cache 110 or 120 may be used as a backup source of data for the logical cache.

In some embodiments, writes are efficiently performed based on implementing persistent cache 110 or 120 as a "write-back" cache relative to persistent storage 112 or 122. Thus, when a data block is written to persistent cache 110 or 120, completion of the write is confirmed to the requestor of the write without waiting for the data block to also be written to persistent storage 112 or 122. The data block is later written to persistent storage 112 or 122 when the data block is evicted from persistent cache 110 or 120.

In an embodiment, secondary storage server 124 comprises the same hierarchy or logical cache: secondary volatile cache 126, secondary persistent cache 120 and secondary persistent storage 122. After an interruption event, when secondary storage server 124 becomes a storage server for database server 100, the data blocks throughout the memory hierarchy are updated using the same techniques described above for storage server 104.

Further techniques are described herein for updating a secondary storage server's fast access memory while a different storage server is a primary storage server for a database server. For example, using techniques described herein, secondary storage server 124 maintains relatively hot data blocks in its persistent storage 120 while the primary storage server 104 is the primary storage server for database storage requests.

Eviction Notifications

Figure 3:
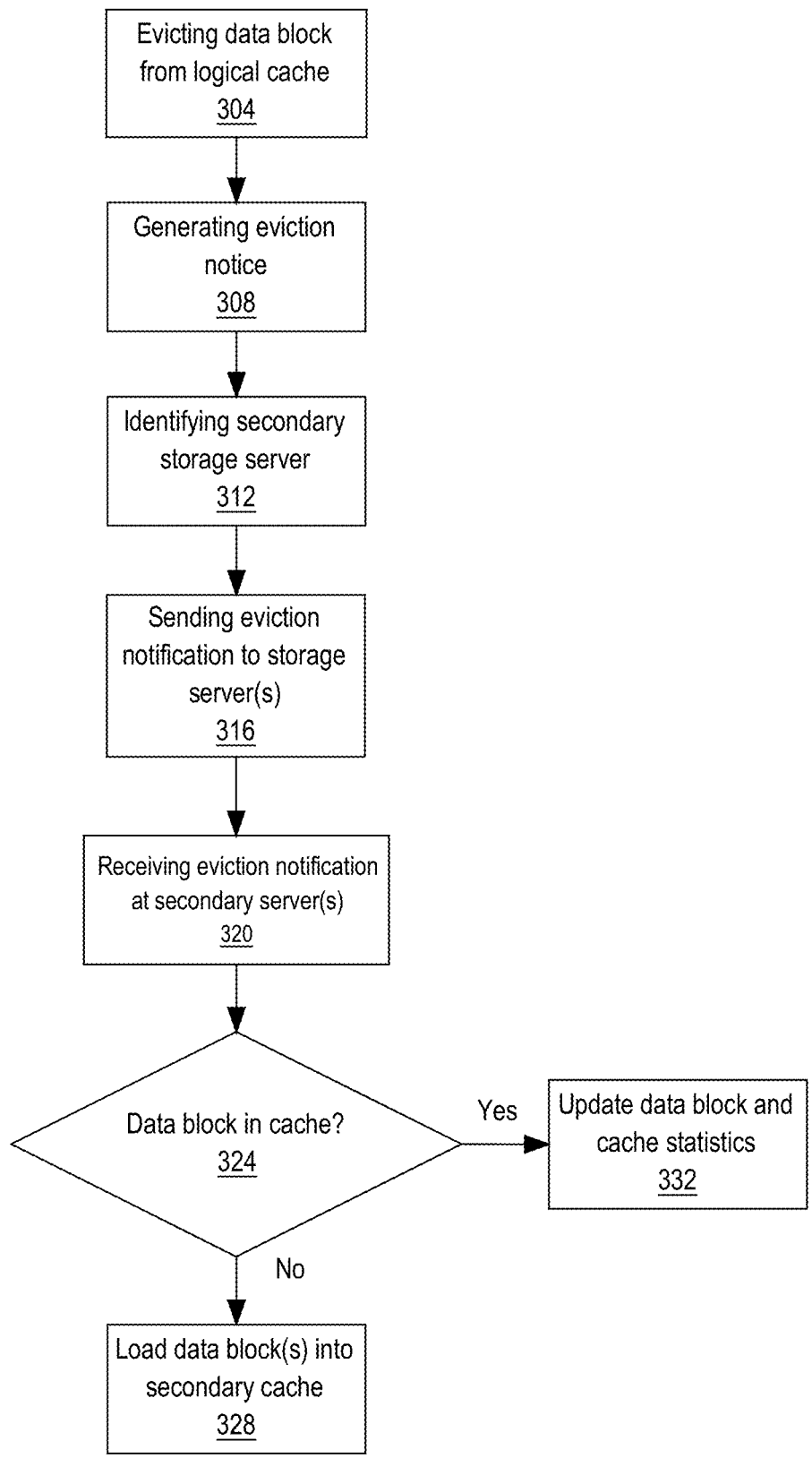
FIG. 3 is a flow diagram that depicts an eviction process in terms of a single data block, in an embodiment.

As mentioned above, clean data blocks are periodically evicted from the logical cache. Such logical cache may be one or more database-side caches 106-108 and in some embodiments, volatile caches 116/126. As will be described in greater detail below, data blocks may be evicted in batches. However, for the sake of clarity and ease of explanation, FIG. 3 is a flow diagram that depicts an eviction process in terms of a single data block, in an embodiment.

At block 304, a data block is evicted from a logical cache based on the policy(ies) of the cache. At block 308, the server hosting the logical cache generates an eviction to be sent to storage server(s). Advantageously, fewer computing resources are involved in the transmission of an eviction notification as compared to the transmission of a data block, because an eviction notification comprises a smaller amount of data than a data block. Typically, an eviction notification comprises metadata that uniquely identifies a data block. For example, an eviction notification may comprise a disk number, an offset, and/or any other address of a data block. The eviction notification contains information necessary for any storage server to identify the data block in its memory (e.g., persistent storage, persistent cache and/or volatile cache).

At block 312, in order to keep cache(s) of the secondary storage server(s) "hot" and have a better hit rate if a failover to a secondary storage server occurs, the server identifies one or more secondary storage servers that are secondary storage servers for the logical cache. At block 316, the server sends the eviction notification to the secondary storage server(s).

For example, database server 100 may evict from database server cache 106 the data block that has the least hit rate because of the need to load a newly requested data block. Upon the eviction, database server 100 generates an eviction notification and determines the target storage servers to send the eviction notification. Database server 100 may send the eviction to all the secondary storage servers or may send to the secondary storage server that is denoted to be the standby spare for the primary storage server. Thus, in addition (or an alternative to) to sending the eviction notification to primary storage server 104, database server 100 sends the eviction notification to secondary storage server 124.

Continuing with FIG. 3, at block 320, a secondary storage server of the logical cache, such as secondary storage server 124, receives the eviction notification.

Logical Cache Extension

Figure 4:
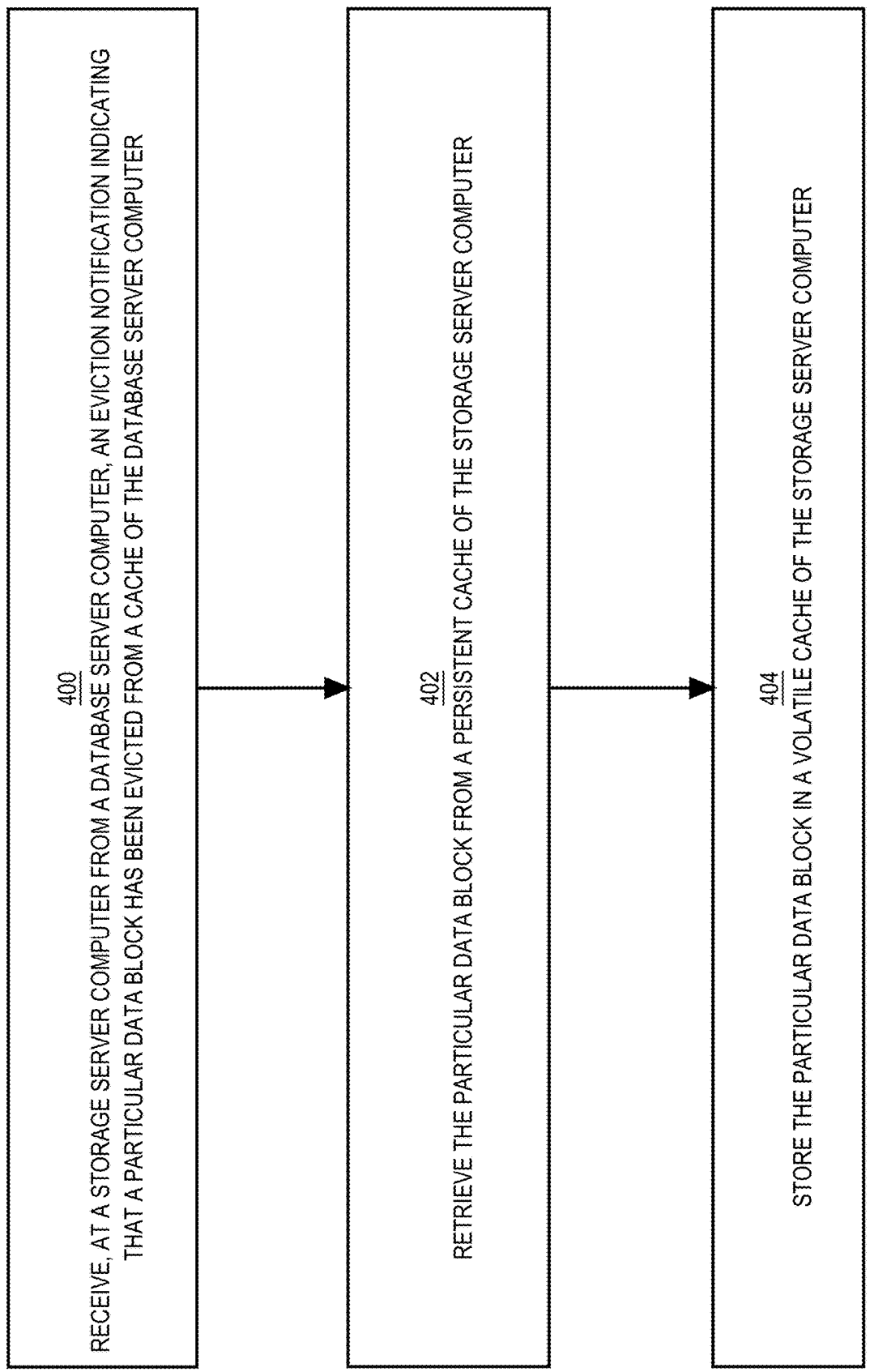
FIG. 4 is a flow diagram that depicts an example approach for responding to an eviction notification, in an embodiment.

Alternatively or additionally to the secondary storage server receiving an eviction notification, the primary storage server of the logical cache may receive a copy of the eviction notification as well. FIG. 4 is a flow diagram that depicts the process for responding to an eviction notification by primary storage server 104. At block 400, primary storage server 104 receives an eviction notification from a database server 100, 102. The eviction notification indicates that the data block has been evicted from one or more database-side caches 106/108.

As mentioned above, primary storage server 104, like secondary storage server 124, comprises memory hierarchy 200 that includes primary volatile cache 116 and primary persistent cache 110. At block 402, storage server 104 retrieves the data block from primary persistent cache 110 upon receiving the eviction notification. For example, storage server 104 may scan primary persistent cache 110 for a memory address corresponding to the disk address included in the eviction notification. Thereafter, storage server 104 may retrieve the data block stored in primary persistent cache 110 at the memory address. Notably, the data block should be in primary persistent cache 110, because primary persistent cache 110 is "inclusive" of the database-side cache 106, 108 from which the data block was evicted.

At block 404, primary storage server 104 stores the data block in primary volatile cache 116. At this point, the data block is stored in both primary volatile cache 116 and primary persistent cache 110, but not in database-side caches 106-108. Thus, primary persistent cache 110 remains "inclusive" of primary volatile cache 116 and database-side caches 106-108. Furthermore, primary volatile cache 116 remains "exclusive" of database-side caches 106-108.

The techniques described for FIG. 4 also apply to secondary storage server 124 and its memory hierarchy, when secondary storage server 124 assumes a role of a primary storage server after a failover and services database servers 100/102's storage requests.

Batch Evictions

In an embodiment, data blocks are evicted from logical cache in batches. For data blocks evicted from a database server cache, the batch eviction ensures that a data block is not stored in primary volatile cache 116 unless the data block has been evicted from all database-side caches 106-108. Thus, until it is determined that the data block is no longer stored in any of database-side caches 106-108, the information about evicted data blocks are batched up. Only after the determination is made, the eviction notification referencing evicted data blocks is sent and received by primary storage server 104. For example, database server 100 may make this determination based on communicating with database server 102 via an interconnect.

In an embodiment, rather than warming up a secondary cache based on evictions from the database server(s), eviction notifications may be caused by evictions from a volatile cache of a primary storage server. In such an embodiment in which the logical cache is extended into primary volatile cache 116 of primary storage server 104, an eviction notification may be generated by primary storage server 104 when data blocks are evicted from the primary volatile cache 116. Not all data block evictions from primary volatile cache 116 may be included in an eviction notification. For example, evictions based on the transfer of a data block to a database cache may not be included in an eviction notification. An eviction notification may be triggered by evicting data block(s) from volatile cache 116 based on hit rates of data blocks rather than read request due to database server cache miss.

Continuing with FIG. 3 at block 320, regardless of the source server of the eviction notification, secondary storage server 124 receives the eviction notification when the data block has been evicted from the logical cache.

Warming Up Secondary Inclusive Cache

At block 324, based on the received eviction notification, secondary storage server 124 determines whether one or more blocks referenced by the eviction notification are loaded in the inclusive cache of secondary storage server 124. A non-limiting example of the inclusive cache for secondary storage server 124 is secondary persistent cache 120. For the data blocks of the eviction notification that are missing in the second cache, at block 328 the secondary storage server 124 accesses the missing data blocks from secondary persistent storage 122. The secondary storage server 124 loads the accessed data blocks into secondary persistent cache 120.

Alternatively, the process may skip the determination at block 324, and at block 328, secondary storage server 124 may load from secondary persistent storage 122 all of the data blocks referenced in the eviction notification. The loading operation itself may skip the already loaded blocks in secondary persistent cache 120.

At block 328, secondary storage server 124 may load the data blocks into secondary persistent cache 120 by accessing the data blocks in the eviction notification in secondary persistent storage 122 using the information in the eviction notification. Non-limiting examples of such information include a disk number, an offset, and/or any other address of a data block included in the eviction notification.

Loading the missing blocks into persistent cache 120 of secondary storage server 124 warms up the inclusive cache based on the data block access requests of the database server(s). Accordingly, the inclusive cache of the secondary storage is updated with frequently accessed data blocks in lock-step with the logical cache. If an interruption event occurs that affects primary storage server 104 from servicing storage requests of database servers 100/102, those storage requests would be routed to secondary storage server 124. With already warmed-up secondary cache 120, the routed storage requests will be serviced with low latency even after the interruption event.

Hit-Rate Statistics

Continuing with FIG. 3, if a determination is made that a data block is already in the secondary inclusive cache, such as secondary persistent cache 120, hit-rate statistics is updated to indicate a higher hit-rate for the data block at block 332. The statistics may be updated for any unit of memory that includes the data block. Non-limiting examples of a unit of memory are the data block itself, the range of data blocks or the range of memory addresses that include the data block; or the memory module or persistent cache 120 that stores the data block.

Using the hit-rate statistics, secondary storage server 124 determines "hot" and "cold" areas of secondary persistent cache 120, in an embodiment. Accordingly, when secondary persistent cache 120 is full for loading new data block(s), secondary storage server 124 may evict data blocks from the cold end of secondary persistent cache 120 according to techniques discussed herein.

Read Requests After Interruption Event

When an interruption event occurs that affects the servicing of storage requests by the primary storage server; the requests are routed to the secondary storage server for the primary storage server. For example, when primary storage server 104 has a critical memory failure, the storage requests for database servers 100/102 are routed to secondary storage server 124. Because, secondary storage server 124 has the same memory architecture 200, in an embodiment, the storage requests are processed using the same techniques as on primary storage server 104.

Figure 5:
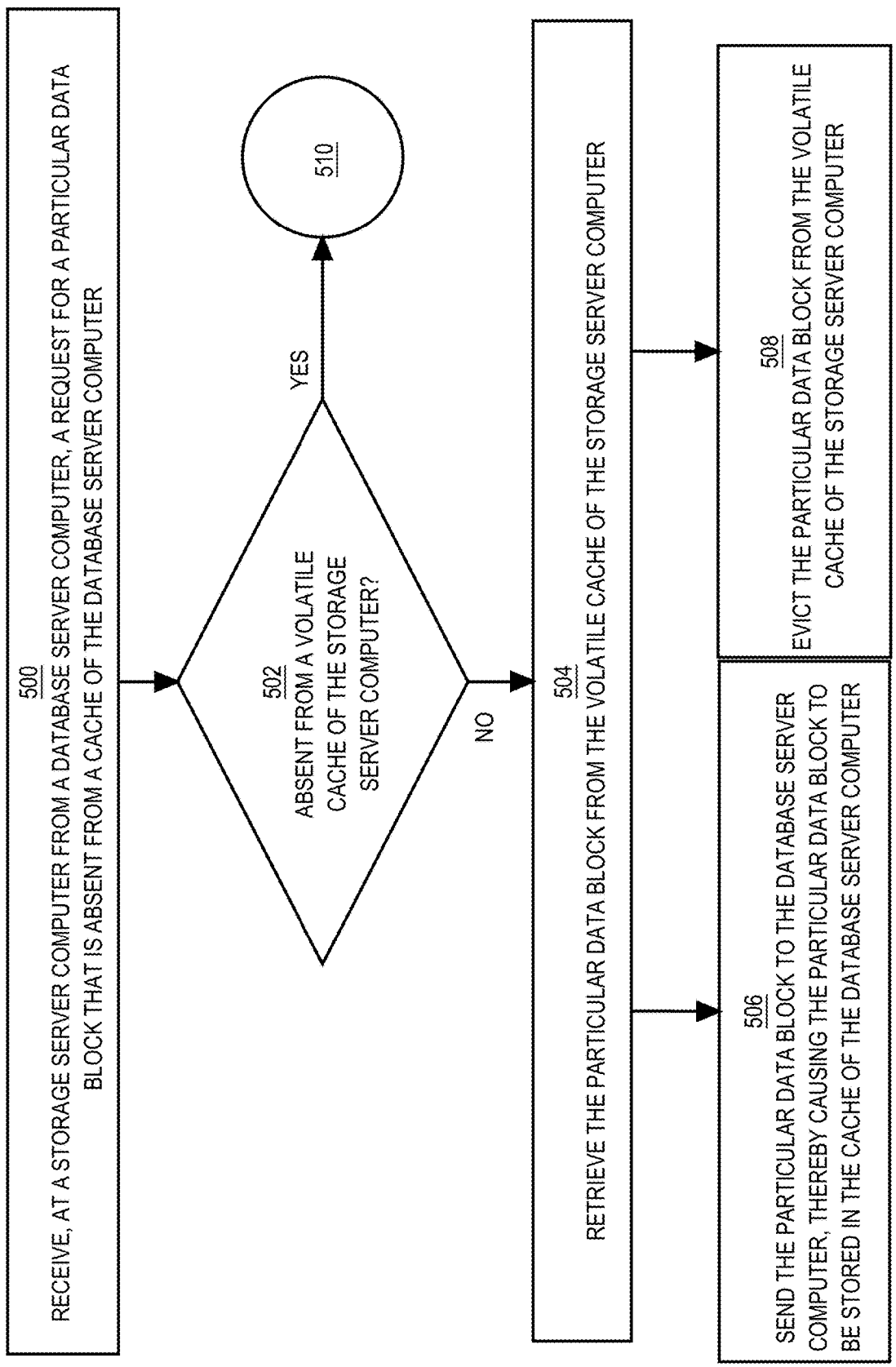
FIGS. 5-6 are flow diagrams that depict an example approach for responding to a read request, in an embodiment.
Figure 6:
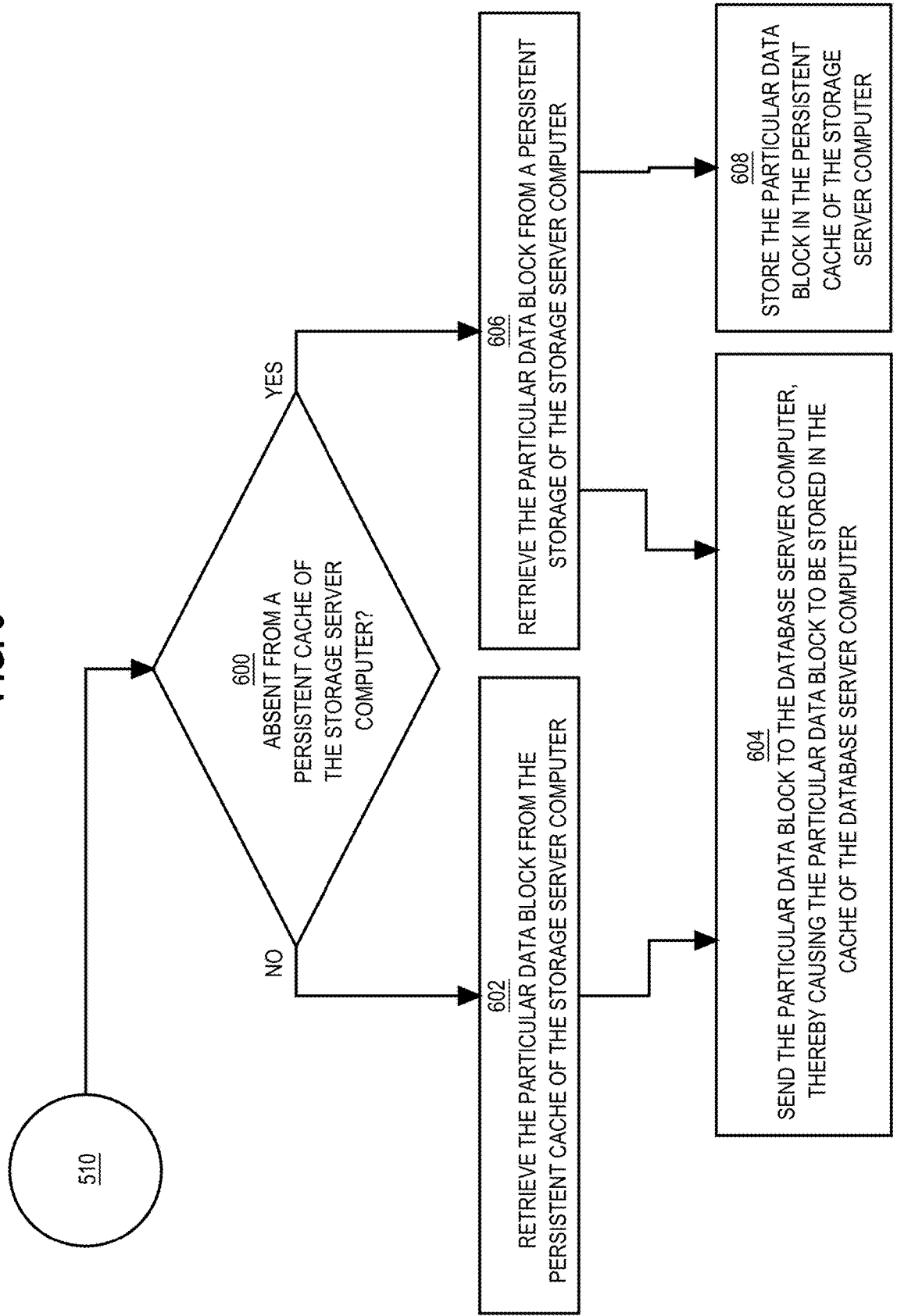

FIGS. 5-6 collectively depict a read process on primary storage server 104 and secondary storage server 124 involving memory hierarchy 200, in one or more embodiments. The read process is performed at the storage-side in response to a cache miss at the database-side in the same manner regardless whether the request is received by primary storage server 104 or secondary storage server 124, in one or more embodiments.

At block 500, storage server 104 or 124 receives a request from a database server 100, 102. The request is for a data block that is absent from a database-side cache 106, 108. In embodiments implementing cache fusion, the request may be for a data block that is absent from all database-side caches 106-108.

At block 502, upon receiving the request, storage server 104 or 124 determines whether the data block is also absent from volatile cache 116 or 126. If storage server 104 or 124 determines that the data block is stored in a volatile cache, block 502 proceeds to block 504. Otherwise, block 502 proceeds to block 510.

At block 504, storage server 104 or 124 retrieves the data block from volatile cache 116 or 126. Block 504 proceeds to blocks 506-508, which may be performed in any order, including concurrently.

At block 506, storage server 104 or 124 sends the data block to the database server 100, 102 that originated the request. This causes the data block to be stored in a cache 106, 108 of the database server 100, 102. In a sense, the data block has been returned to the "hot" end of a logical cache comprising database-side caches 106-108 and storage-side volatile cache 116 or 126.

At block 508, storage server 104 or 124 evicts the data block from volatile cache 116 or 126. Doing so maintains the "exclusive" relationship between volatile cache 116 or 126 and database-side caches 106-108.

Block 510 connects FIG. 5 to FIG. 6. Block 510 proceeds to block 600 of FIG. 6. FIG. 6 depicts the read process after storage server 104 or 124 determines that the data block is absent from volatile cache 116 or 126.

At block 600, storage server 104 or 124 determines whether the data block is stored in persistent cache 110 or 120. If storage server 104 or 124 determines that the data block is stored in persistent cache 110 or 120, block 600 proceeds to block 602. Otherwise, block 600 proceeds to block 604.

At block 602, storage server 104 or 124 retrieves the data block from persistent cache 110 or 120. As mentioned above, the set of data in persistent cache 110 or 120 is "inclusive" of the set of data in a logical cache comprising volatile cache 116 or 126 and database-side caches 106-108. Thus, persistent cache 110 or 120 may store data that is absent from the logical cache.

At block 604, storage server 104 or 124 sends the data block to the database server 100, 102 that originated the request. This causes the data block to be stored in a cache 106, 108 of the database server 100, 102.

At block 606, storage server 104 or 124 retrieves the data block from persistent storage 112 upon determining that the data block is absent from persistent cache 110 or 120. Block 606 proceeds to blocks 604 and 608, which can be performed in any order, including concurrently.

At block 608, storage server 104 or 124 stores the data block in persistent cache 110 or 120. This ensures that persistent cache 110 or 120 remains "inclusive" of database-side caches 106-108.

In an embodiment, the process for writing a data block is performed using one or more steps for the above-described steps of the reading process because to update any data block; the database server has to first read the data block.

Primary Storage Recovery After Interruption Event

After an interruption event, the primary storage server may recover and may be activated to service storage requests from database servers. However, as discussed above, after the recovery, one or more of the primary storage server's caches are wiped clean or contain outdated data. Thus, if the primary storage server starts to service storage requests, there will be many cache misses which would cause high latency for storage requests. The primary storage server would have to retrieve the requested data blocks from slower-access persistent storage.

For example, even if the interruption event was a partial failure of one of the persistent cache modules of primary persistent cache 110, the storage requests for the affected module are redirected to secondary storage server 124. When the defective module is replaced, the new module has no data. Thus, if new requests are directed to the new module, there will be many cache misses.

Figure 7:
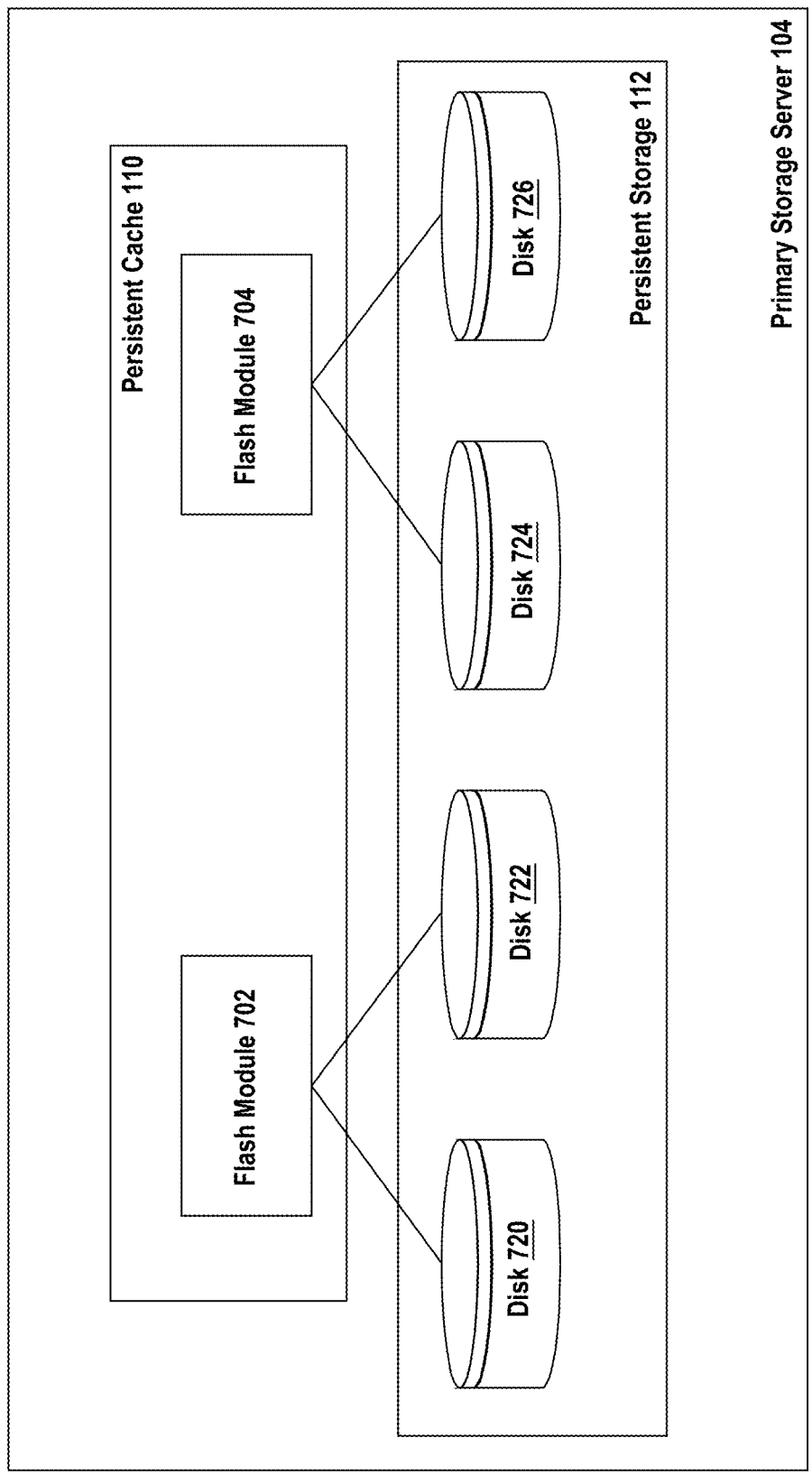
FIG. 7 is a block diagram that depicts an example of a physical architecture for secondary persistent cache and secondary persistent storage, in an embodiment.

FIG. 7 is a block diagram that depicts an example of a physical architecture for persistent cache 110 and persistent storage 112. In FIG. 7, persistent cache 110 includes flash modules 702 and 704. Each of this flash modules services a different set of disks and thus different sets of data blocks. Flash module 702 is a persistent cache for disk 720 and 722 of persistent storage 112, and flash module 704 is a persistent cache for disk 724 and 726. In such an example, flash module 702 may fail and be replaced with a new one. Thereon, the primary storage server 104 may be online and ready to service all storage requests. However, any storage request for a data block with memory addresses of disk 720 and disk 722 is to be retrieved from disk 720 and 722 rather than from fast-access flash module 702 because flash module 702 is initially empty. Such storage requests would experience high latency and cause performance issues for client applications. At the same time, storage requests to data blocks with memory addresses of disk 724 are serviced with low latency because many of the requests are cache hits for data blocks stored in flash module 704.

To ameliorate the adverse effects of empty cache for a newly recovered primary storage server, the storage requests for data blocks with affected address ranges are continued to be routed to the secondary storage server that has taken over after the failover. During this period, the primary storage server's affected cache is warmed up similar to a secondary storage server. The primary storage server receives eviction notifications and using techniques described herein updates the primary persistent cache with missing data blocks from the persistent storage. Thus, the roles of storage servers are reversed such that the secondary storage server continues to perform as a primary storage server, while the primary storage server becomes a secondary storage server and receives eviction notifications for warming up the inclusive cache.

Figure 8:
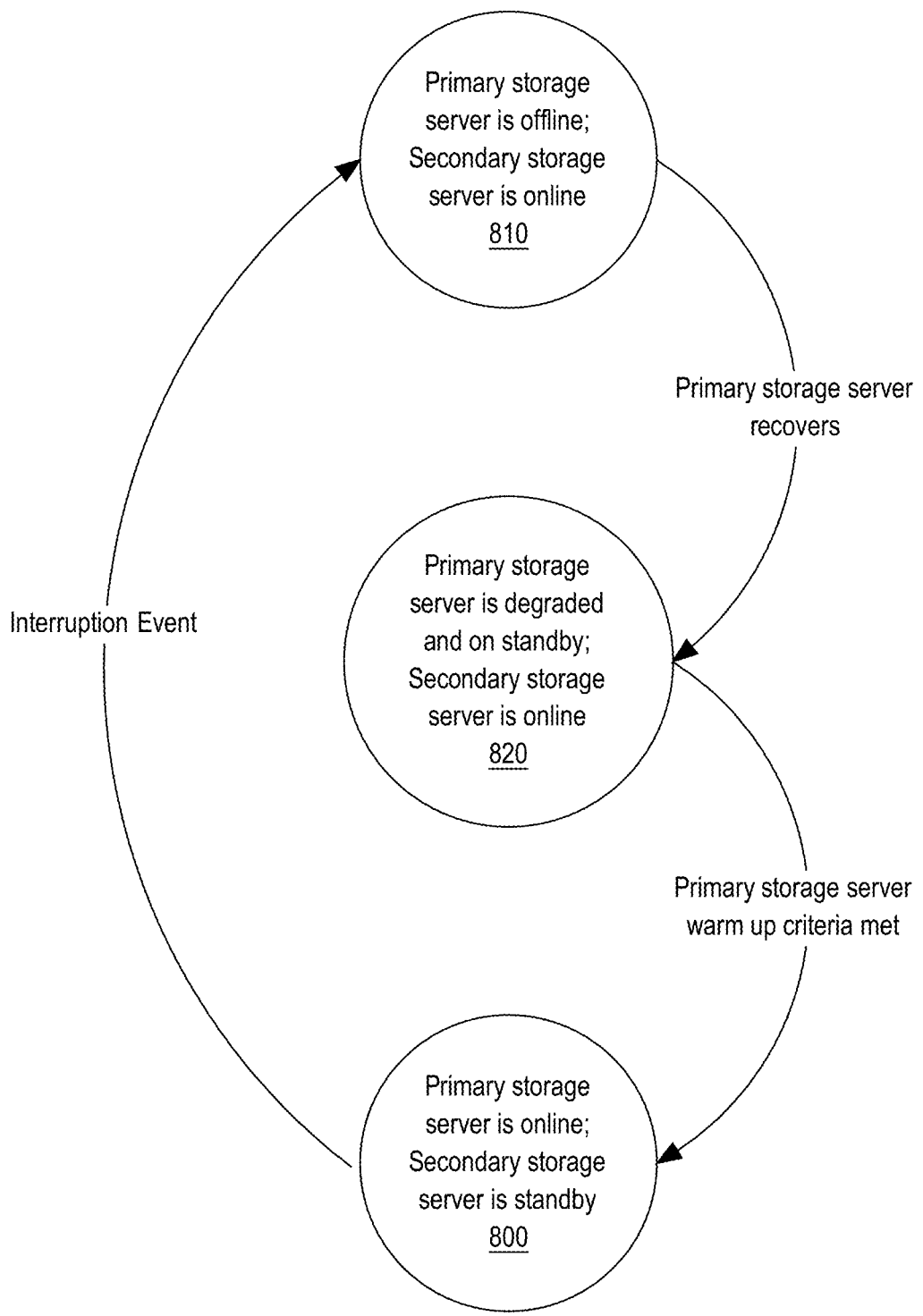
FIG. 8 is a state diagram that depicts transitions of states for primary and secondary storage servers caused by an interruption event, in an embodiment.

FIG. 8 is a state diagram that depicts transitions of states for primary and secondary storage servers caused by an interruption event, in an embodiment. At initial state 800, the primary storage server 104's health indicates online and actively servicing storage requests from database servers 100/102. Secondary storage server 124 is a secondary storage server in a standby mode and maintains warm cache by processing eviction notification using techniques described herein.

After an interruption event, the state of primary storage server 104 is degraded at state 810 to indicate offline health state. At state 810, secondary storage server 124 is online and takes over servicing storage requests that cannot be any longer serviced by primary storage server 104. The transition does not adversely affect the speed of servicing storage requests because secondary storage server 124 has warmed up the inclusive cache.

After primary storage server 104 recovers from the interruption and can potentially service the storage requests, the health state is upgraded to indicate a degraded state rather than the online state at state 820. However, to avoid cache misses, secondary storage server 124 continues servicing storage requests at state 820. Meanwhile, primary storage server 104 receives eviction notifications to warm-up inclusive cache using techniques described herein.

Cache Warm Up Criterion

In an embodiment, the satisfaction of a "warm-up criterion" determines whether the recovered primary storage server can be reconfigured to perform as a primary storage server for the database server(s). The term "warm-up criterion" refers herein to a criterion which defines when an initially empty inclusive cache is sufficiently warmed-up such that the hit-rate statistics for the cache is similar to a cache that was never emptied.

In the example described above for FIG. 7, warmed up criterion may be that the hit-rate for new flash module 702 is within a threshold of the hit-rate of continuously functioning flash module 704. Alternatively, if the all of primary storage server 104's inclusive cache has been wiped or outdated, then upon the recovery, the hit-rate for newly warmed-up primary persistent cache 110 is compared with the hit-rate of secondary persistent cache 120.

When the warm-up criterion is met for recovered primary storage server 104, the state transitions to state 800. At state 800, primary storage server 104 is upgraded to indicate an online health state. Database servers 100/102 redirect storage requests from secondary storage server 124 to warmed-up primary storage server 104. At state 800, secondary storage server 124 returns to a secondary role and receives eviction notification to keep persistent cache 120 warmed up.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
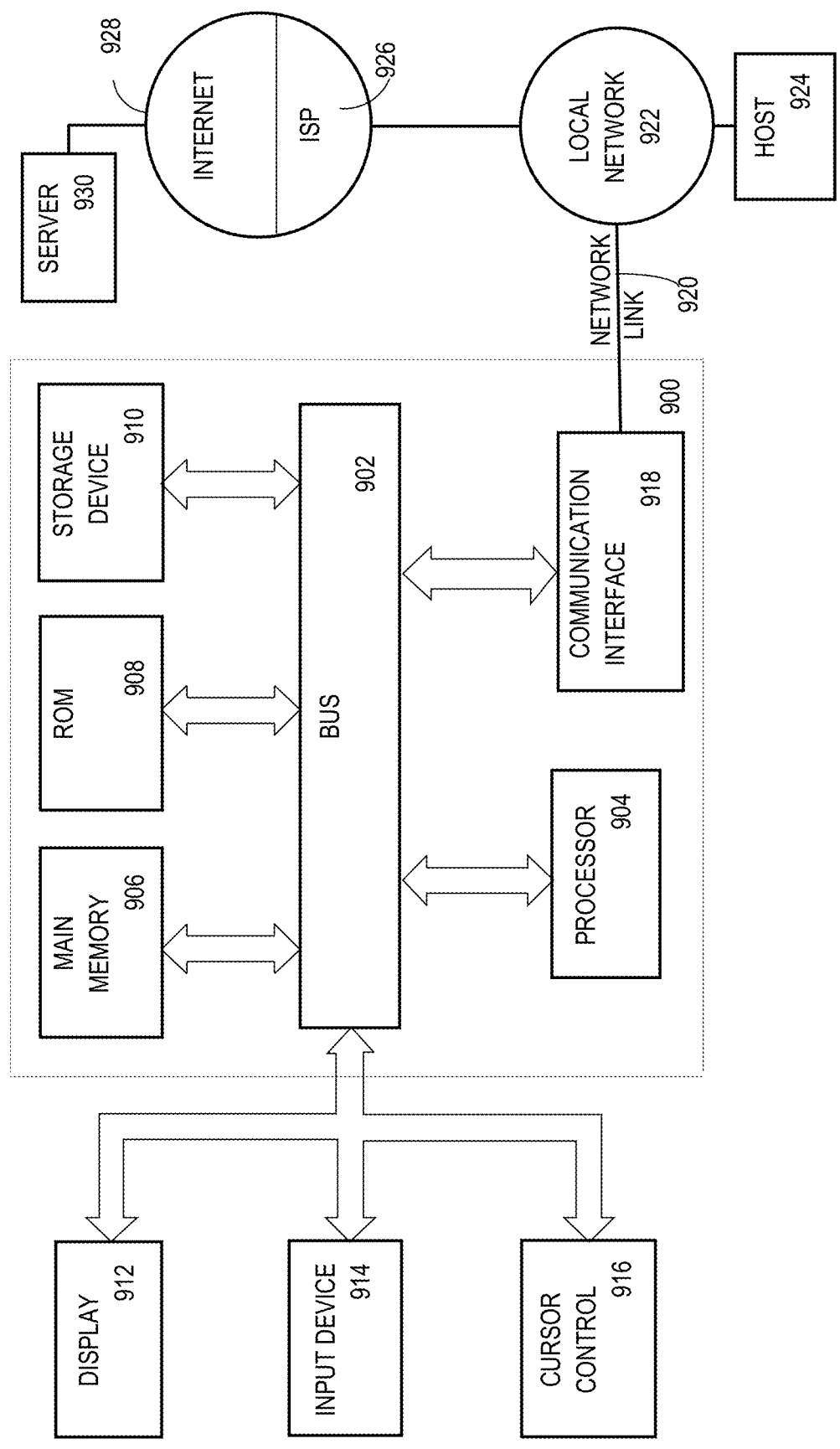
FIG. 9 is a block diagram that depicts an example computer system upon which embodiments of the techniques may be implemented.

For example, FIG. 9 is a block diagram that illustrates a computer system 900 upon which an embodiment of the disclosure may be implemented. Computer system 900 includes a bus 902 or another communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or another dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal, and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926, in turn, provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

Software Overview

Figure 10:
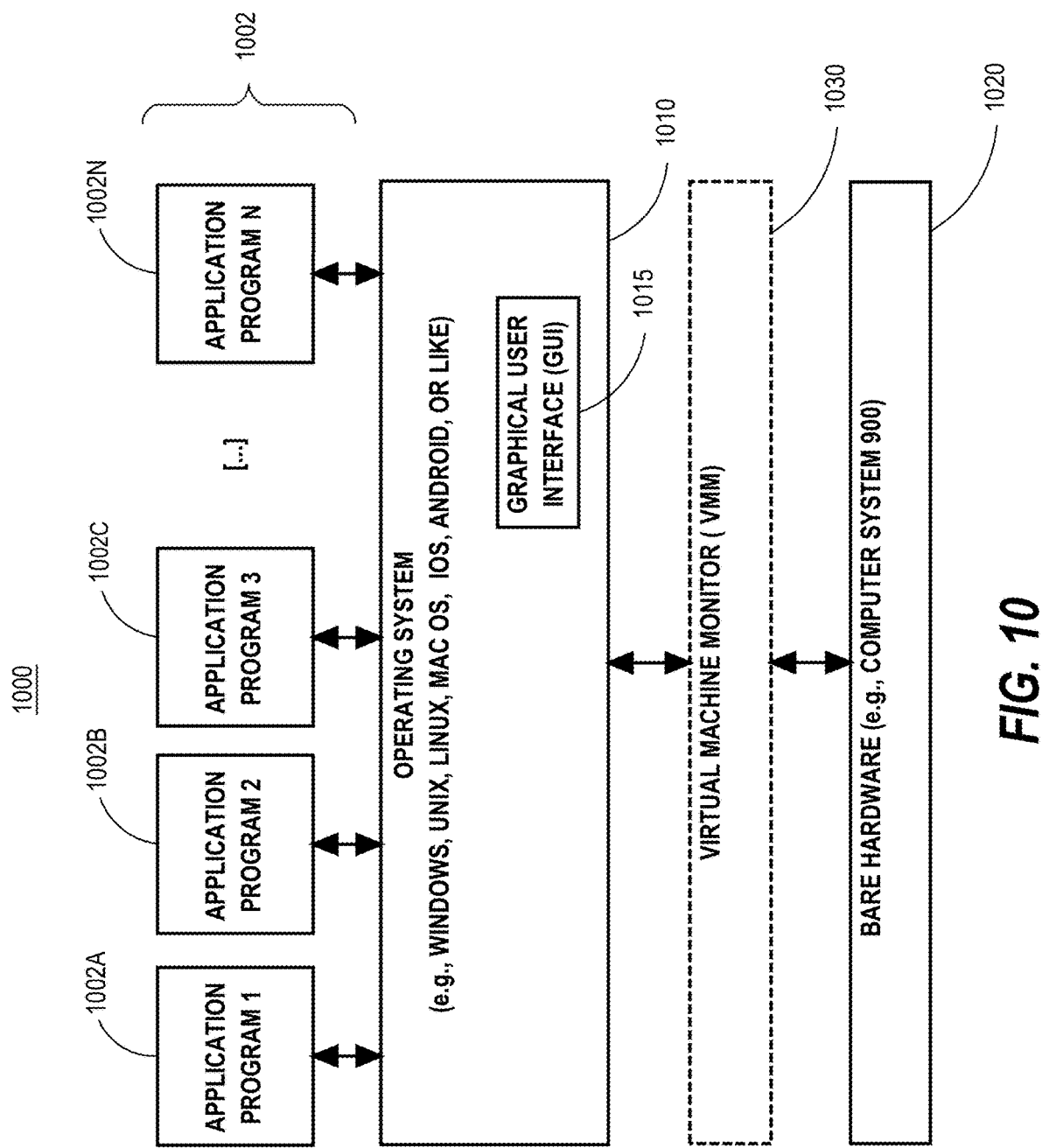
FIG. 10 is a block diagram that depicts a software system for controlling the operation of the computer system, in one or more embodiments.

FIG. 10 is a block diagram of a software system 1000 that may be employed for controlling the operation of computer system 900. Software system 1000 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1000 is provided for directing the operation of computer system 900. Software system 1000, which may be stored in system memory (RAM) 906 and on fixed storage (e.g., hard disk or flash memory) 910, includes a kernel or operating system (OS) 1010.

The OS 1010 manages low-level aspects of computer operation, including managing execution of processes, memory allocation, file input and output (I/O), and device I/O. One or more application programs represented as 1002A, 1002B, 1002C . . . 1002N, may be "loaded" (e.g., transferred from fixed storage 910 into memory 906) for execution by the system 900. The applications or other software intended for use on system 900 may also be stored as a set of downloadable computer-executable instructions, for example, for downloading and installation from an Internet location (e.g., a Web server, an app store, or another online service).

Software system 1000 includes a graphical user interface (GUI) 1015, for receiving user commands and data in a graphical (e.g., "point-and-click" or "touch gesture") fashion. These inputs, in turn, may be acted upon by the system 1000 in accordance with instructions from operating system 1010 and/or application(s) 1002. The GUI 1015 also serves to display the results of operation from the OS 1010 and application(s) 1002, whereupon the user may supply additional inputs or terminate the session (e.g., log off).

OS 1010 can execute directly on the bare hardware 1020 (e.g., processor(s) 904) of system 1000. Alternatively, a hypervisor or virtual machine monitor (VMM) 1030 may be interposed between the bare hardware 1020 and the OS 1010. In this configuration, VMM 1030 acts as a software "cushion" or virtualization layer between the OS 1010 and the bare hardware 1020 of the system 900.

VMM 1030 instantiates and runs one or more virtual machine instances ("guest machines"). Each guest machine comprises a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware 1020 of system 900 directly. In these instances, the same version of the guest operating system configured to execute on the bare hardware 1020 directly may also execute on VMM 1030 without modification or reconfiguration. In other words, VMM 1030 may provide full hardware and CPU virtualization to a guest operating system in some instances.

In other instances, a guest operating system may be specially designed or configured to execute on VMM 1030 for efficiency. In these instances, the guest operating system is "aware" that it executes on a virtual machine monitor. In other words, VMM 1030 may provide para-virtualization to a guest operating system in some instances.

The above-described basic computer hardware and software are presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method:
receiving, at a secondary storage server of a database server, an eviction notification indicating that a first set of data blocks has been evicted from a particular cache, the secondary storage server persistently storing a copy of data, which is persistently stored on a primary storage server and includes a first copy of the first set of data blocks;
wherein the secondary storage server comprises a memory hierarchy including a secondary cache and a secondary persistent storage that stores a second copy of the first set of data blocks;
upon receiving the eviction notification:
retrieving the second copy of the first set of data blocks from the secondary persistent storage of the secondary storage server, and
loading, into the secondary cache, the second copy of the first set of data blocks;
after an interruption event, receiving, at the secondary storage server, a first request for at least a subset of the first set of data blocks based on a request for data, at the database server, that includes at least the subset of the first set of data blocks;
upon receiving the first request for at least the subset of the first set of data blocks:
retrieving at least the subset of the first set of data blocks from the second copy of the first set of data blocks stored on the secondary cache of the secondary storage server without retrieving any data block of at least the subset of the first set of data blocks from the second copy of the first set of data blocks stored on the secondary persistent storage of the secondary storage server, and
sending at least the subset of the first set of data blocks to the database server.

2. The method of claim 1, wherein the secondary cache is persistent cache memory.

3. The method of claim 1, wherein the primary storage server comprises a memory hierarchy including a volatile cache.

4. The method of claim 1, wherein the particular cache from which the first set of data blocks has been evicted is a volatile cache of the primary storage server.

5. The method of claim 1, wherein the particular cache from which the first set of data blocks has been evicted is a volatile cache of the database server.

6. The method of claim 1, further comprising:
receiving, at the secondary storage server of the database server, a second eviction notification indicating that a second set of data blocks has been evicted from the particular cache;
determining that the second set of data blocks includes one or more data blocks from the first set of data blocks that are stored in the secondary cache;
updating metadata for the one or more data blocks to indicate that the one or more data blocks have been accessed thereby incrementing hit-rate statistics for the one or more data blocks.

7. The method of claim 6, further comprising:
determining that the secondary cache is above a threshold capacity of data blocks based at least on the hit-rate statistics for the one or more data blocks, evicting at least one data block from the secondary cache.

8. The method of claim 1, further comprising sending the eviction notification indicating that the first set of data blocks has been evicted from the database server to the primary storage server.

9. The method of claim 1, wherein the interruption event is triggered by a memory failure on the primary storage server, and the method further comprises:
degrading a primary health state of the primary storage server to indicate that the primary storage server is offline.

10. The method of claim 1, wherein the secondary cache is a secondary persistent cache, and the memory hierarchy of the second storage server further comprises a secondary volatile cache, and the method further comprises:
after the interruption event:
receiving, at the secondary storage server of the database server, a second eviction notification indicating that a second set of data blocks has been evicted from the particular cache;

upon receiving the second eviction notification:
retrieving the second set of data blocks from the secondary persistent cache of the secondary storage server, and
storing the second set of data blocks in the secondary volatile cache of the second storage server.

11. The method of claim 1, wherein the interruption event is triggered by a memory failure on the primary storage server, and the method further comprises:
after degrading a primary health state of the primary storage server to indicate that the primary storage server is offline, detecting that the primary storage server has recovered;
updating the primary health state of the primary storage server to indicate a degraded health state rather than an online state;
after updating the primary health state of the primary storage server to indicate a degraded health state:
receiving, at the primary storage server, a second eviction notification indicating that a second set of data blocks has been evicted from the particular cache;
upon receiving the second eviction notification:
retrieving a copy of the second set of data blocks from a primary persistent storage of the primary storage server, and
loading into a primary persistent cache the copy of the second set of data blocks.

12. The method of claim 1, wherein the primary storage server includes a primary persistent cache, which comprises a first non-volatile memory module and a second non-volatile memory module and the method further comprises:
wherein the interruption event is triggered by a failure with the first non-volatile memory module;
detecting, after the interruption event, that the first non-volatile memory module is replaced with a new first non-volatile memory module;
performing loading into a persistent cache of the new first non-volatile memory module one or more sets of data blocks based on eviction notices received by the primary storage server;
comparing a hit rate of the persistent cache of the new first non-volatile memory module with a hit rate of a persistent cache of the second non-volatile memory module,
based on the comparing, determining a health state of the primary storage server.

13. The method of claim 12, further comprising:
based at least in part on a difference between the hit rate of the persistent cache of the new first non-volatile memory module and the hit rate of the persistent cache of the second non-volatile memory module being less than a threshold, causing the health state of the primary storage server to indicates that the primary storage server is online.

14. A computer-implemented method:
generating an eviction notification indicating that a set of data blocks has been evicted from a particular cache of a database server;
determining that, for a first storage server, which is designated as a primary storage server for the database server, a second storage server is a secondary storage server for the primary storage server that stores a first copy of the set of data blocks;
wherein the secondary storage server comprises a memory hierarchy of at least a secondary cache and a secondary persistent storage that stores a copy of data stored in the primary storage server including a second copy of the set of data blocks;
sending, to the secondary storage server, the eviction notification indicating that the set of data blocks has been evicted from the particular cache of the database server;
wherein a receipt of the eviction notification by the secondary storage server causes the secondary storage server to:
retrieve the second copy of the set of data blocks from the secondary persistent storage of the secondary storage server, and
load, into the secondary cache, the second copy of the set of data blocks;
after an interruption event:
receiving a request for data from at least a subset of the set of data blocks,
causing, at the secondary storage server, retrieving at least the subset of the set of data blocks from the second copy of the set of data blocks stored on the particular cache of the secondary storage server without causing retrieving any data block from the second copy of the set of data blocks stored on the secondary persistent storage of the secondary storage server, and
receiving at least the subset of the set of data blocks from the secondary storage server.

15. One or more non-transitory computer-readable media storing instructions, wherein the instructions include set of instructions, which when executed by one or more hardware processors, cause:
receiving, at a secondary storage server of a database server, an eviction notification indicating that a first set of data blocks has been evicted from a particular cache, the secondary storage server persistently storing a copy of data, which is persistently stored on a primary storage server and includes a first copy of the first set of data blocks;
wherein the secondary storage server comprises a memory hierarchy including a secondary cache and a secondary persistent storage that stores a second copy of the first set of data blocks;
upon receiving the eviction notification:
retrieving the second copy of the first set of data blocks from the secondary persistent storage of the secondary storage server, and
loading, into the secondary cache, the second copy of the first set of data blocks;
after an interruption event, receiving, at the secondary storage server, a first request for at least a subset of the first set of data blocks based on a request for data, at the database server, that includes at least the subset of the first set of data blocks;
upon receiving the first request for at least the subset of the first set of data blocks:
retrieving at least the subset of the first set of data blocks from the second copy of the first set of data blocks stored on the secondary cache of the secondary storage server without retrieving any data block of at least the subset of the first set of data blocks from the second copy of the first set of data blocks stored on the secondary persistent storage of the secondary storage server, and
sending at least the subset of the first set of data blocks to the database server.

16. The one or more non-transitory computer-readable media of claim 15, wherein the secondary cache is persistent cache memory.

17. The one or more non-transitory computer-readable media of claim 15, wherein the primary storage server comprises a memory hierarchy including a volatile cache.

18. The one or more non-transitory computer-readable media of claim 15, wherein the particular cache from which the first set of data blocks has been evicted is a volatile cache of the primary storage server.

19. The one or more non-transitory computer-readable media of claim 15, wherein the set of instructions further include instructions, which, when executed by said one or more hardware processors, cause sending the eviction notification indicating that the first set of data blocks has been evicted from the database server to the primary storage server.

20. The one or more non-transitory computer-readable media of claim 15, wherein the set of instructions further include instructions, which, when executed by said one or more hardware processors, cause:
receiving, at the secondary storage server of the database server, a second eviction notification indicating that a second set of data blocks has been evicted from the particular cache;
determining that the second set of data blocks includes one or more data blocks from the first set of data blocks that are stored in the secondary cache;
updating metadata for the one or more data blocks to indicate that the one or more data blocks have been accessed thereby incrementing hit-rate statistics for the one or more data blocks.

21. The one or more non-transitory computer-readable media of claim 20, wherein the set of instructions further include instructions, which, when executed by said one or more hardware processors, cause:
determining that the secondary cache is above a threshold capacity of data blocks based at least on the hit-rate statistics for the one or more data blocks, evicting at least one data block from the secondary cache.

22. The one or more non-transitory computer-readable media of claim 15, wherein the set of instructions further include instructions, which, when executed by said one or more hardware processors, cause sending the eviction notification indicating that the first set of data blocks has been evicted from the database server to the primary storage server.

23. The one or more non-transitory computer-readable media of claim 15, wherein the interruption event is triggered by a memory failure on the primary storage server, and wherein the set of instructions further include instructions, which, when executed by said one or more hardware processors, cause:
degrading a primary health state of the primary storage server to indicate that the primary storage server is offline.

24. The one or more non-transitory computer-readable media of claim 15, wherein the secondary cache is a secondary persistent cache, and the memory hierarchy of the second storage server further comprises of a secondary volatile cache, and wherein the set of instructions further include instructions, which, when executed by said one or more hardware processors, cause:
after the interruption event:
receiving, at the secondary storage server of the database server, a second eviction notification indicating that a second set of data blocks has been evicted from the particular cache;
upon receiving the second eviction notification:
retrieving the second set of data blocks from the secondary persistent cache of the secondary storage server, and
storing the second set of data blocks in the secondary volatile cache of the second storage server.

25. The one or more non-transitory computer-readable media of claim 15, wherein the interruption event is triggered by a memory failure on the primary storage server, and wherein the set of instructions further include instructions, which, when executed by said one or more hardware processors, cause:
after degrading a primary health state of the primary storage server to indicate that the primary storage server is offline, detecting that the primary storage server has recovered;
updating the primary health state of the primary storage server to indicate a degraded health state rather than an online state;
after updating the primary health state of the primary storage server to indicate a degraded health state:
receiving, at the primary storage server, a second eviction notification indicating that a second set of data blocks has been evicted from the particular cache;
upon receiving the second eviction notification:
retrieving a copy of the second set of data blocks from a primary persistent storage of the primary storage server, and
loading into a primary persistent cache the copy of the second set of data blocks.

26. The one or more non-transitory computer-readable media of claim 15, wherein the primary storage server includes a primary persistent cache, which comprises a first non-volatile memory module and a second non-volatile memory module and wherein the set of instructions further include instructions, which, when executed by said one or more hardware processors, cause:
wherein the interruption event is triggered by a failure with the first non-volatile memory module;
detecting, after the interruption event, that the first non-volatile memory module is replaced with a new first non-volatile memory module;
performing loading into a persistent cache of the new first non-volatile memory module one or more sets of data blocks based on eviction notices received by the primary storage server;
comparing a hit rate of the persistent cache of the new first non-volatile memory module with a hit rate of a persistent cache of the second non-volatile memory module,
based on the comparing, determining a health state of the primary storage server.

27. The one or more non-transitory computer-readable media of claim 26, wherein the set of instructions further include instructions, which, when executed by said one or more hardware processors, cause:
based at least in part on a difference between the hit rate of the persistent cache of the new first non-volatile memory module and the hit rate of the persistent cache of the second non-volatile memory module being less than a threshold, causing the health state of the primary storage server to indicates that the primary storage server is online.

28. One or more non-transitory computer-readable media storing instructions, wherein the instructions include set of instructions, which when executed by one or more hardware processors, cause:

generating an eviction notification indicating that a set of data blocks has been evicted from a particular cache of a database server;

determining that, for a first storage server, which is designated as a primary storage server for the databases server, a second storage server is a secondary storage server for the primary storage server that stores a first copy of the set of data blocks;

wherein the secondary storage server comprises a memory hierarchy of at least a secondary cache and a secondary persistent storage that stores a copy of data stored in the primary storage server including a second copy of the set of data blocks;

sending, to the secondary storage server, the eviction notification indicating that the set of data blocks has been evicted from the particular cache of the database server;

wherein a receipt of the eviction notification by the secondary storage server causes the secondary storage server to:
retrieve the second copy of the set of data blocks from the secondary persistent storage of the secondary storage server, and
load, into the secondary cache, the second copy of the set of data blocks;

after an interruption event:
receiving a request for data from at least a subset of the set of data blocks,
causing, at the secondary storage server, retrieving at least the subset of the set of data blocks from the second copy of the set of data blocks stored on the particular cache of the secondary storage server without causing retrieving any data block from the second copy of the set of data blocks stored on the secondary persistent storage of the secondary storage server, and
receiving at least the subset of the set of data blocks from the secondary storage server.

* * * * *

UNITED STATES PATENT AND TRADEMARK OFFICE
CERTIFICATE OF CORRECTION

Page 1 of 1

PATENT NO. : 10,831,666 B2
APPLICATION NO. : 16/153674
DATED : November 10, 2020
INVENTOR(S) : Shi et al.

It is certified that error appears in the above-identified patent and that said Letters Patent is hereby corrected as shown below:

On the Title Page

On page 2, Column 2, item (56), under Other Publications, Line 37, delete "not" and insert -- *not* --, therefor.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*